United States Patent [19]

Shimada et al.

[11] 4,455,168
[45] Jun. 19, 1984

[54] AQUEOUS INK FOR INK-JET PRINTING

[75] Inventors: Masaru Shimada, Tagata; Tadashi Fujii, Yokohama, both of Japan

[73] Assignee: Ricoh Company, Ltd., Tokyo, Japan

[21] Appl. No.: 453,548

[22] Filed: Dec. 27, 1982

[30] Foreign Application Priority Data

Jan. 5, 1982 [JP] Japan .............................. 57-000055
Jan. 21, 1982 [JP] Japan .............................. 57-006787
Jan. 21, 1982 [JP] Japan .............................. 57-006788

[51] Int. Cl.³ .......................................... C09D 11/02
[52] U.S. Cl. ........................................ 106/22; 106/20
[58] Field of Search .................................. 106/20, 22; 260/DIG. 28

[56] References Cited

U.S. PATENT DOCUMENTS 3,846,141 11/1974 Ostergren et al. ............... 106/22
4,150,997 4/1979 Hayes ........................... 106/20
4,153,593 5/1979 Zabiak et al. ................... 106/22
4,285,757 8/1981 Uehara et al. ................... 106/22

Primary Examiner—John Kight, III
Assistant Examiner—Amelia B. Yarbrough
Attorney, Agent, or Firm—Flynn, Thiel, Boutell & Tanis

[57] ABSTRACT

An aqueous ink for ink-jet printing comprises a water-soluble dye, water and a compound selected from the group consisting and the compounds of formula (I) and the compounds of formula (II):

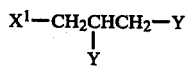

$$X^1-CH_2CHCH_2-Y \qquad (I)$$

wherein $X^1$ represents

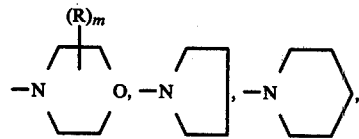

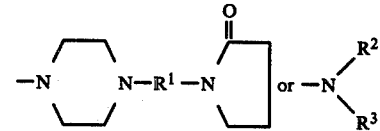

in which R, $R^1$, $R^2$ and $R^3$ independently represent an alkyl group with 1 to 4 carbon atoms or a hydroxyalkyl group with 1 to 4 carbon atoms, and m is an integer of 0 to 2; and at least one of the two Y's is a hydroxyl group, and, when one Y, but not both Y's, is a hydroxyl group, the Y that is not a hydroxyl group is the same as the above-mentioned $X^1$;

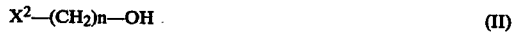

$$X^2-(CH_2)_n-OH \qquad (II)$$

wherein $X^2$ represents

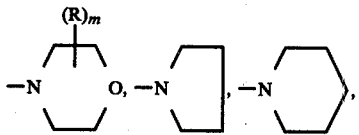

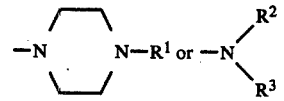

in which R, $R^1$, $R^2$ and $R^3$ independently represent an alkyl group with 1 to 4 carbon atoms or a hydroxyalkyl group with 1 to 4 carbon atoms, m is an integer of 0 to 2, and n is an integer of 1 to 6.

16 Claims, No Drawings

AQUEOUS INK FOR INK-JET PRINTING

BACKGROUND OF THE INVENTION

The present invention relates to an improved aqueous ink for ink-jet printing.

Conventionally, to aqueous ink for fountain pens and pen recorders, and to stamping ink, there is added as a humectant a polyhydric alcohol, such as ethylene glycol, diethylene glycol, polyethylene glycol or glycerin, in order to prevent hardening of the ink at the tips of the pens and on the stamp pads.

In the case where ink containing one of the above-mentioned polyhydric alcohols is employed for ink-jet printing, the polyhydric alcohol serves to prevent the ink from becoming hard within the nozzles of an ink-jet printing apparatus during the periods when the apparatus is not in use. However, in the case where the same ink supply is to remain in the printing apparatus for a long period of time, and the printing apparatus is used intermittently, for instance, once a week, and the periods of use and non-use are repeated, it frequently occurs that the dyes and other materials are separated from the ink in the form of precipitates and become affixed around the nozzles, so that the nozzles become plugged. As a result, it becomes difficult or totally impossible to eject the ink droplets from the nozzles as desired.

The above described problems of the conventional aqueous inks can be solved to some extent by increasing the amount of the polyhydric alcohols to be added to the inks. However, as the amount of the polyhydric alcohols in the ink increases (for instance, to more than 30 wt.%), the drying speed of the ink droplets deposited by printing on a recording sheet significantly decreases.

SUMMARY OF THE INVENTION

It is therefore an object of the present invention is to provide an aqueous ink for ink-jet printing which does not result in plugging of the nozzle, and does not change in quality or separate precipitates therefrom with time during storage or periods of non-use, but exhibits excellent ink ejection stability, has good ink ejection response, and shows slight changes in physical properties, if any, when used for a long period with continuous recirculation, or when used intermittently.

According to the present invention, the above object can be attained by an aqueous ink for ink-jet printing comprising as its main components (i) a water-soluble dye, such as a water-soluble Color Index Direct Dye or water-soluble Color Index Acid Dye, (ii) water, (iii) a compound selected from the group consisting of the compounds of the following formula (I) and the compounds of the following formula (II), and, if necessary, with addition thereto of (iv) a humectant, such as a polyhydric aliphatic alcohol or an alkyl ether of a polyhydric aliphatic alcohol, and (v) an antiseptic and anti-mold agent. The formulas (I) and (II) are:

$$X^1-CH_2CHCH_2-Y \atop Y \qquad (I)$$

wherein $X^1$ represents 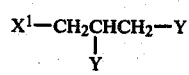

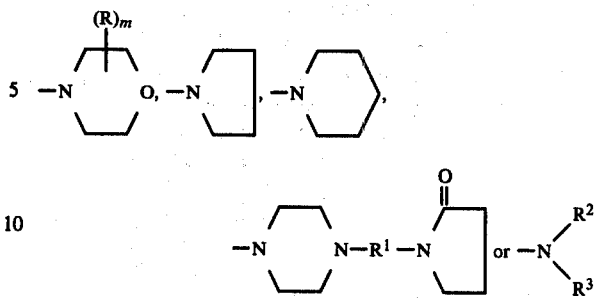

in which R, $R^1$, $R^2$ and $R^3$ independently represent an alkyl group with 1 to 4 carbon atoms or a hydroxyalkyl group with 1 to 4 carbon atoms, and m is an integer of 0 to 2; and at least one of the two Y's is a hydroxyl group, and, when one Y, but not both Y's, is a hydroxyl group, the Y that is not a hydroxyl group is the same as the above-mentioned $X^1$; and $$X^2-(CH_2)n-OH \qquad (II)$$

wherein $X^2$ represents

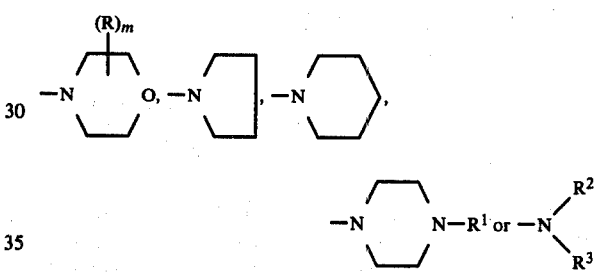

in which R, $R^1$, $R^2$ and $R^3$ independently represent an alkyl group with 1 to 4 carbon atoms or a hydroxyalkyl group with 1 to 4 carbon atoms; m is an integer of 0 to 2; and n is an integer of 1 to 6.

In the present invention, it is preferable that the amount of the water soluble dye be in the range of 1 wt.% to 10 wt.% in the ink in order to obtain high printing density, and it is also preferable that the amount of the above described compounds of the formula (I) or formula (II) in the ink be in the range of 0.5 wt.% to 50 wt.%.

When the amount of the compounds of the formula (I) or formula (II) is less than 0.5 wt.%, clogging of the nozzles with the ink is apt to occur because those compounds are not present in sufficient quantities to function, while, when the amount is more than 50 wt.%, the viscosity of the ink increases because of the presence of too much of those compounds themselves, so that the droplet ejection of the ink from the nozzles becomes difficult.

As mentioned above, it is considered that the above-described compounds serve to increase the solubilities of the water-soluble dyes in the aqueous ink according to the present invention. Possibly for this reason, when a humectant, such as a polyhydric aliphatic alcohol or an alkyl ether of a polyhydric aliphatic alcohol, is used together with the above-described compounds, the amount of polyhydric aliphatic alcohol or the alkyl ether thereof can be decreased, whereby printing speed can be increased due to an increase of the drying speed of the ink.

DETAILED DESCRIPTION OF THE PREFERRED EMBODIMENTS

A first embodiment of an aqueous ink for ink-jet printing according to the present invention comprises as its main components (i) a water-soluble Color Index Direct Dye and/or a water-soluble Color Index Acid Dye, (ii) water, (iii) a compound of formula (Ia) which belongs to the compounds of the previously described formula (I), (iv) a humectant, such as a polyhydric aliphatic alcohol or an alkyl ether thereof, when necessary, and (v) a preservative and anti-mold agent, when necessary.

$$X^1-CH_2CHCH_2-OH \atop OH \qquad (Ia)$$

wherein $X^1$ represents

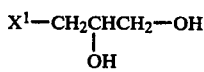

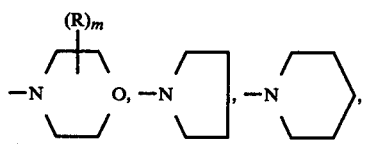

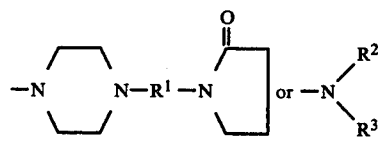

in which R, $R^1$, $R^2$ and $R^3$ independently represent an alkyl group with 1 to 4 carbon atoms or a hydroxyalkyl group with 1 to 4 carbon atoms; and m is an integer of 0 to 2.

As the antiseptic and anti-mold agents, for example, the following chemicals can be employed: 2,2-dimethyl-acetoxy-dioxane-1,3, dehydrosodium acetate, p-ethoxybenzoic acid, p-hydroxy benzoic acid butyl ester, potassium sorbate, 2-pyridine thiol-1oxidesodium salt, anionic surface active agents, Deltop 33 (commercially available from Takeda Chemical Industries Ltd.), and Bioside 880 (commercially available from Taisho Co., Ltd).

Because the compounds of the formula (Ia) are themselves so hygroscopic, they can be used as humectants instead of polyhydric aliphatic alcohols or alkyl ethers of polyhydric aliphatic alcohols.

Specific examples of the compounds of the formula (Ia) are as follows:
3-morpholino propylene glycol
3-(N-methyl) piperazino propylene glycol
3-(N-propyl) piperazino propylene glycol
3-(1-piperidine) propylene glycol
3-(1-pyrrolidine) propylene glycol
3-(1-pyrrolidine-2-one) propylene glycol
3-(N,N-dimethyl) aminopropylene glycol
3-(2,6-dimethyl) morpholino propylene glycol In addition to the above components, the following chelating agents for increasing the water-solubility of divalent metallic compounds contained in small quantities in the water can be added: disodium ethylenediaminetetraacetate, trisodium nitrilotriacetate, hydroxyethyl ethylenediamine trisodium acetate, diethylene triamino pentasodium acetate and uramil disodium acetate.

The compounds of the above-described formula (Ia) can by synthesized easily.

For instance, 3-morpholino propylene glycol can be prepared as in the following example:

Synthesis of 3-morpholino propylene glycol 33 g of 3-chloropropylene glycol was added dropwise to 65 g morpholine, with stirring, while maintaining the temperature at 80° C. The 3-chloropropylene glycol reacted quickly with the morpholine exothermically. The reaction mixture was stirred for 3 hours, with the temperature maintained at 80° C. The salt of morpholine, which separated from the reaction mixture, was filtered out. The filtrate was distilled under reduced pressure. This distillation gave 35 g of the desired product, 3-morpholino propylene glycol (bp. 135°-138° C./11 mmHg), in a 75.5% yield.

This reaction product was identified as 3-morpholino propylene glycol by elemental analysis with the following results:

|  | % C | % H | % N |
| --- | --- | --- | --- |
| Calculated | 52.17 | 9.32 | 8.70 |
| Found | 52.08 | 9.39 | 8.62 |

Specific aqueous inks for ink-jet printing of the type containing compounds of the previously described formula (Ia) will now be described by referring to the following Examples Ia-1 through Ia-5.

Example Ia-1

A mixture of the following components was heated to 50° C., stirred until completely dissolved, then filtered through a Teflon filter with a 0.22 μm mesh to yield an embodiment of an aqueous ink for ink-jet printing according to the present invention:

|  | wt. % |
| --- | --- |
| Direct Black 38 (C.I. No. 30235) | 3.5 |
| Glycerin | 5.0 |
| Diethylene glycol | 10.0 |
| 3-morpholino propylene glycol | 5.0 |
| Dehydrosodium acetate | 0.2 |
| Ion-exchanged water | 76.3 |

The properties of the thus prepared ink were as follows:

|  | pH = 10.5 | (25° C.) |
| --- | --- | --- |
| Viscosity: | 1.98 cP | (25° C.) |
| Surface tension: | 48.0 dynes/cm | (25° C.) |

The ink was then subjected to the following tests:

(1) Image Clarity and Image Dryness Test

The ink was caused to issue from a nozzle with an inner diameter of 30 μm, with vibrations at a frequency of 100 KHz, by which vibrations the ink was ejected in a stream broken into individual drops, and was then caused to impinge on commercially available high quality paper. As a result, clear images were obtained on the paper. The time required for drying the printed image was not more than 10 seconds at normal room temperature and humidity.

(2) Preservability Test

Samples of the ink were tightly sealed in glass containers and subjected to the following storage tests
a. Preserved for one month at −20° C.;
b. Preserved for one month at 4° C.;
c. Preserved for one year at 20° C.; and
d. Preserved for one week at 90° C.

Separation of precipitates from the ink was not observed at all in storage. In addition, no changes were detected in the properties or color of the ink.

(3) Ink Droplet Ejection Stability Test

Ink-jet printing as was done in the above-described Image Clarity and Image Dryness Test was continuously performed for 1,000 hours. There was no evidence of either clogging of the nozzle or change in ejection direction of the ink droplets; rather, stable printing was maintained.

(4) Ink Droplet Ejection Response Test

After ink-jet printing was performed as outlined in (1), the apparatus and ink were allowed to stand for one month at room temperature and humidity, after which they were used again to perform ink-jet printing under the same conditions as previously stated in (1). As in (3) above, there was no change in the ink droplet ejection stability.

The above test was repeated in the same manner, except that the apparatus and ink were allowed to stand for one week at 40° C., 30% RH, instead of being allowed to stand for one month at room temperature and humidity. The result was that again no change was observed in the ink droplet ejection stability.

Example Ia-2

Example Ia-1 was repeated except that the components of the ink employed in Example Ia-1 were replaced by the following components:

|  | wt. % |
|---|---|
| Acid Black 2 (C.I. No. 50420) | 3.0 |
| Triethylene glycol monomethyl ether | 15.0 |
| 3-(N'—methyl) piperazino propylene glycol | 3.0 |
| 2,2-dimethyl-6-acetoxy-dioxane-1,3 | 0.2 |
| Ethylenediamine tetrasodium acetate | 0.1 |
| Ion-exchanged water | 78.7 |

The properties of the ink were:

| | | |
|---|---|---|
| | pH = 10.2 | (25° C.) |
| Viscosity: | 2.03 cP | (25° C.) |
| Surface tension: | 47.5 dynes/cm | (25° C.) |

Example Ia-3

Example Ia-1 was repeated except that the components of the ink employed in Example Ia-1 were replaced by the following components:

|  | wt. % |
|---|---|
| Direct Black 19 (C.I. No. 35255) | 4.0 |
| Diethylene glycol | 5.0 |
| 3-(1-piperidine) propylene glycol | 10.0 |
| p-ethoxy benzoic acid | 0.2 |
| Ion-exchanged water | 80.8 |

The properties of the ink were:

| | | |
|---|---|---|
| | pH = 10.5 | (25° C.) |
| Viscosity: | 2.00 cP | (25° C.) |
| Surface tension: | 54.5 dynes/cm | (25° C.) |

Example Ia-4

Example Ia-1 was repeated except that the components of the ink employed in Example Ia-1 were replaced by the following components:

|  | wt. % |
|---|---|
| Direct Black 154 | 4.0 |
| 3-(2,6-dimethyl) morpholino propylene glycol | 18.0 |
| Dehydrosodium acetate | 0.2 |
| Ion-exchanged water | 77.8 |

The properties of the ink were:

| | | |
|---|---|---|
| | pH = 10.4 | (25° C.) |
| Viscosity: | 1.8 cP | (25° C.) |
| Surface tension: | 48.5 dynes/cm | (25° C.) |

Example Ia-5

Example Ia-1 was repeated except that the components of the ink employed in Example Ia-1 were replaced by the following components:

|  | wt. % |
|---|---|
| Acid Red 92 (C.I. No. 45410) | 3.0 |
| Glycerin | 3.0 |
| Diethylene glycol monomethyl ether | 10.0 |
| 3-(1-pyrrolidine) propylene glycol | 4.5 |
| Dehydrosodium acetate | 0.2 |
| Ion-exchanged water | 79.3 |

The properties of the ink were:

| | | |
|---|---|---|
| | pH = 10.0 | (25° C.) |
| Viscosity: | 2.2 cP | (25° C.) |
| Surface tension: | 53.5 dynes/cm | (25° C.) |

Comparative Example Ia-1

Example Ia-1 was repeated except that the components of the ink employed in Example Ia-1 were replaced by the following components:

|  | wt. % |
|---|---|
| Direct Black 38 | 3.5 |
| Glycerin | 5.0 |
| Diethylene glycol | 15.5 |
| Dehydrosodium acetate | 0.2 |
| Ion-exchanged water | 76.5 |

The properties of the ink were:

| | | |
|---|---|---|
| | pH = 10.2 | (25° C.) |
| Viscosity: | 2.00 cP | (25° C.) |
| Surface tension: | 50.2 dynes/cm | (25° C.) |

Comparative Example Ia-2

Example Ia-1 was repeated except that the components of the ink employed in Example Ia-1 were replaced by the following components:

|  | wt. % |
|---|---|
| Acid Black 2 | 3.0 |
| Triethylene glycol monomethyl ether | 20.0 |
| 2,2-dimethyl-6-acetoxy-dioxane-1,3 | 0.1 |
| Ethylene diamine tetrasodium acetate | 0.1 |
| Ion-exchanged water | 76.8 |

The properties of the ink were:

|  | pH = 10.3 | (25° C.) |
|---|---|---|
| Viscosity: | 1 95 cP | (25° C.) |
| Surface tension: | 48.0 dynes/cm | (25° C.) |

Comparative Example Ia-3

Example Ia-1 was repeated except that the components of the ink employed in Example Ia-1 were replaced by the following components:

|  | wt. % |
|---|---|
| Direct Black 19 | 4.0 |
| Diethylene glycol | 20.0 |
| p-ethoxy benzoic acid | 0.2 |
| Ion-exchanged water | 75.8 |

The properties of the ink were:

|  | pH = 10.5 | (25° C.) |
|---|---|---|
| Viscosity: | 2.05 cP | (25° C.) |
| Surface tension: | 51.0 dynes/cm | (25° C.) |

The inks of Examples Ia-2 through Ia-5 were subjected to the same ink droplet ejection response test as done in Example Ia-1, and the same excellent results were obtained as Example Ia-1. However, in Comparative Examples Ia-1 through Ia-3, the nozzles became partially clogged when the apparatus and ink were allowed to stand at normal room temperature and humidity for one week, and when the apparatus and ink were allowed to stand at 40° C./30% RH for one day, the direction of ejected ink droplets became extremely unstable and normal ink-jet printing was impossible.

A second embodiment of an aqueous ink for ink-jet printing according to the present invention was prepared, in which the compounds of the formula (Ia) employed in the previously described first embodiment were replaced by compounds of the following formula (Ib) which also belonged to the compounds of the previously described formula (I), and the other components were substantially the same as those employed in the first embodiment.

$$X^1-CH_2CHCH_2-Y \quad \text{(Ib)}$$
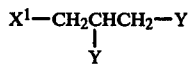

wherein $X^1$ represents

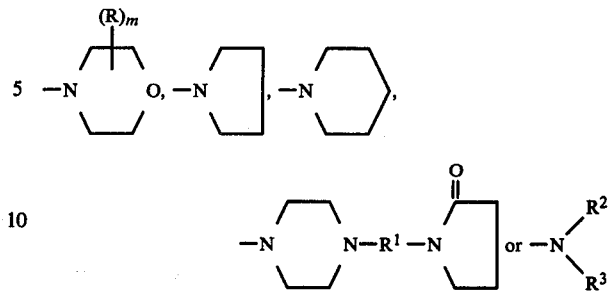

in which R, $R^1$, $R^2$ and $R^3$ independently represent an alkyl group with 1 to 4 carbon atoms or a hydroxyalkyl group with 1 to 4 carbon atoms, m is an integer of 0 to 2, and one of the two Y's is a hydroxyl group, but the other Y is the same as the above-mentioned $X^1$.

Because the compounds of the formula (Ib) also are themselves so hygroscopic, they can be used as humectants instead of polyhydric aliphatic alcohols or alkyl ethers or polyhydric aliphatic alcohols.

Specific examples of the compounds of the formula (Ib) are as follows:
1,3-dimorpholino-2-propanol
1,3-di-(2,6-dimethyl) morpholino-2-propanol
1,3-di-(1-pyrrolidine)-2-propanol
1,3-di-(1-piperidine)-2-propanol
1,3-di-(N-methyl) piperazino-2-propanol
1,3-di-(N-hydroxyethyl) piperazino-2-propanol
1,3-di-(1-pyrrolidine-2-one)-2-propanol
1,3-di-(N,N-diethyl) amino-2-propanol
1,3-di-(N,N-dihydroxyethyl) amino-2-propanol
2,3-dimorpholino-1-propanol
2,3-di-(2,6-dimethyl) morpholino-1-propanol
2,3-di-(1-pyrrolidine)-1-propanol
2,3-di-(1-piperidine)-1-propanol
2,3-di-(N-methyl) piperazino-1-propanol
2,3-di-(N-hydroxyethyl) piperazino-1-propanol
2,3-di-(1-pyrrolidine-2-one)-1-propanol
2,3-di-(N,N-diethyl) amino-1-propanol
2,3-di-(N,N-dihydroxyethyl) amino-1-propanol The compounds of the above-described formula (Ib) can be synthesized easily.

For instance, 1,3-dimorpholino-2-propanol, and 2,3-dimorpholino-1-propanol can be prepared as in the following examples:

Synthesis of 1,3-dimorpholino-2-propanol 21.8 g of 1,3-dibromo-2-propanol was added dropwise over a period of 1 hour to 34.8 g of morpholine, with stirring, the temperature being kept between 105° C. and 110° C. The stirring was continued for 3 hours, with the temperature maintained in the above-mentioned range. The salt of morpholine, which separated from the resulting solution, was filtered out, and the filtrate was distilled under reduced pressure. By this distillation, 18.9 g of the desired product, 1,3-dimorpholino-2-propanol (bp. 164°-167° C./10 mmHg), was obtained in a 82.2% yield.

This reaction product was identified as 1,3-dibromo-2-propanol by elemental analysis with the following results:

|  | % C | % H | % N |
|---|---|---|---|
| Calculated | 57.39 | 9.57 | 12.17 |

-continued

|  | % C | % H | % N |
|---|---|---|---|
| Found | 57.31 | 9.60 | 12.04 |

Synthesis of 2,3-dimorpholino-1-propanol 21.8 g of 2,3-dibromo-1-propanol was added dropwise over a period of 1 hour to 34.8 g of morpholine, with stirring, the temperature being kept between 105°–110° C. The stirring was continued for 3 hours, with the temperature maintained in the above-mentioned range. The salt of morpholine, which separated form the resulting solution, was filtered out, and the filtrate was distilled under reduced pressure. By this distillation, 15.5 g of the desired product, 2,3-dimorpholino-1-propanol (bp. 165° C./10 mmHg), was obtained in a 67.4% yield.

This reaction product was identified as 2,3-dibromo-1-propanol by elemental analysis with the following results:

|  | % C | % H | % N |
|---|---|---|---|
| Calculated | 57.39 | 9.57 | 12.17 |
| Found | 57.34 | 9.58 | 12.11 |

Specific aqueous inks for ink-jet printing of the type containing compounds of the formula (Ib) will now be described by referring to the following Examples Ib-1 through Ib-12.

Example Ib-1

A mixture of the following components was heated to 50° C., stirred until completely dissolved, then filtered through a Telfon filter with 0.22 μm mesh to yield an embodiment of an aqueous ink for ink-jet printing according to the present invention:

|  | wt. % |
|---|---|
| C.I. Direct Black 38 | 3.5 |
| Glycerin | 3.5 |
| Diethylene glycol | 13.5 |
| 1,3-dimorpholino-2-propanol | 3.0 |
| Dehydrosodium acetate | 0.2 |
| Ion-exchanged water | 76.3 |

The properties of the thus prepared ink were:

| pH = | 10.5 | (20° C.) |
|---|---|---|
| Viscosity: | 2.2 cP | (20° C.) |
| Surface tension: | 50.8 dynes/cm | (20° C.) |

Example Ib-2

Example Ib-1 was repeated except that the components of the ink employed in Example Ib-1 were replaced by the following components:

|  | wt. % |
|---|---|
| C.I. Direct Black 154 | 3.5 |
| Polyethylene glycol 200 | 15.0 |
| 1,3-di-(N—methylpiperazino)-2-propanol | 5.0 |
| Dehydrosodium acetate | 0.2 |
| Ion-exchanged water | 76.3 |

The properties of the thus prepared ink were:

| pH = | 10.4 | (20° C.) |
|---|---|---|
| Viscosity: | 2.3 cP | (20° C.) |
| Surface tension: | 51.5 dynes/cm | (20° C.) |

Example Ib-3

Example Ib-1 was repeated except that the components of the ink employed in Example Ib-1 were replaced by the following components:

|  | wt. % |
|---|---|
| C.I. Direct Black 19 | 3.0 |
| 1,3-di-(2,6-dimethyl) morpholino-2-propanol | 15.0 |
| Dehydrosodium acetate | 0.2 |
| Ion-exchanged water | 81.8 |

The properties of the thus prepared ink were:

| pH = | 10.4 | (20° C.) |
|---|---|---|
| Viscosity: | 2.1 cP | (20° C.) |
| Surface tension: | 50.5 dynes/cm | (20° C.) |

Example Ib-4

Example Ib-1 was repeated except that the components of the ink employed in Example Ib-1 were replaced by the following components:

|  | wt. % |
|---|---|
| C.I. Acid Black 2 | 1.0 |
| C.I. Direct Black 38 | 2.0 |
| Triethylene glycol monomethyl ether | 10.0 |
| 1,3-di-(pyrrolidine)-2-propanol | 6.0 |
| Dehydrosodium acetate | 0.2 |
| Ion-exchanged water | 80.8 |

The properties of the thus prepared ink were:

| pH = | 10.4 | (20° C.) |
|---|---|---|
| Viscosity: | 2.0 cP | (20° C.) |
| Surface tension: | 50.8 dynes/cm | (20° C.) |

Example Ib-5

Example Ib-1 was repeated except that the components of the ink employed in Example Ib-1 were replaced by the following components:

|  | wt. % |
|---|---|
| C.I. Acid Blue 9 | 3.0 |
| C.I. Acid Yellow 23 | 0.5 |
| Polyethylene glycol 200 | 15.0 |
| 1,3-di-(1-pyrrolidine-2-one)-2-propanol | 3.5 |
| Deltop 33 (commercially available from Takeda Chemical Industries, Ltd.) | 0.2 |
| Ion-exchanged water | 77.8 |

The properties of the thus prepared ink were:

| pH = | 10.2 | (20° C.) |
|---|---|---|
| Viscosity: | 2.2 cP | (20° C.) |

-continued

| Surface tension: | 51.8 dynes/cm | (20° C.) |

Example Ib-6

Example Ib-1 was repeated except that the components of the ink employed in Example Ib-1 were replaced by the following components:

| | wt. % |
|---|---|
| C.I. Acid Red 92 | 4.0 |
| Polyethylene glycol 200 | 16.0 |
| 1,3-di-(1-piperidine-2-one)-2-propanol | 2.0 |
| Bioside 880 (commercially available from Taisho Co., Ltd.) | 0.2 |
| Ion-exchanged water | 77.8 |

The properties of the thus prepared ink were:

| pH = | 10.3 | (20° C.) |
|---|---|---|
| Viscosity: | 2.2 cP | (20° C.) |
| Surface tension: | 54.0 dynes/cm | (20° C.) |

Example Ib-7

Example Ib-7 was repeated except that the components of the ink employed in Example Ib-1 were replaced by the following components:

| | wt. % |
|---|---|
| C.I. Direct Black 38 | 3.5 |
| Glycerin | 3.5 |
| Diethylene glycol | 13.5 |
| 2,3-di-morpholino-1-propanol | 3.0 |
| Dehydrosodium acetate | 0.2 |
| Ion-exchanged water | 77.8 |

The properties of the thus prepared ink were:

| pH = | 10.5 | (20° C.) |
|---|---|---|
| Viscosity: | 2.3 cP | (20° C.) |
| Surface tension: | 54.8 dynes/cm | (20° C.) |

Example Ib-8

Example Ib-1 was repeated except that the components of the ink employed in Example Ib-1 were replaced by the following components:

| | wt. % |
|---|---|
| C.I. Direct Black 154 | 3.5 |
| Polyethylene glycol 200 | 15.0 |
| 2,3-di-(2,6-dimethyl) morpholino-1-propanol | 5.0 |
| Dehydrosodium acetate | 0.2 |
| Ion-exchanged water | 76.3 |

The properties of the thus prepared ink were:

| pH = | 10.4 | (20° C.) |
|---|---|---|
| Viscosity: | 2.2 cP | (20° C.) |
| Surface tension: | 51.8 dynes/cm | (20° C.) |

Example Ib-9

Example Ib-1 was repeated except that the components of the ink employed in Example Ib-1 were replaced by the following components:

| | wt. % |
|---|---|
| C.I. Direct Black 19 | 3.0 |
| 2,3-di-morpholino-1-propanol | 15.0 |
| Dehydrosodium acetate | 0.2 |
| Ion-exchanged water | 81.8 |

The properties of the thus prepared ink were:

| pH = | 10.5 | (20° C.) |
|---|---|---|
| Viscosity: | 2.0 cP | (20° C.) |
| Surface tension: | 50.2 dynes/cm | (20° C.) |

Example Ib-10

Example Ib-1 was repeated except that the components of the ink employed in Example Ib-1 were replaced by the following components:

| | wt. % |
|---|---|
| C.I. Acid Black 2 | 1.0 |
| C.I. Direct Black 38 | 2.0 |
| Triethylene glycol monomethyl ether | 10.0 |
| 2,3-di(N—methyl) piperazino-1-propanol | 6.0 |
| Dehydrosodium acetate | 0.2 |
| Ion-exchanged water | 80.8 |

The properties of the thus prepared ink were:

| pH = | 10.4 | (20° C.) |
|---|---|---|
| Viscosity: | 2.0 cP | (20° C.) |
| Surface tension: | 50.8 dynes/cm | (20° C.) |

Example Ib-11

Example Ib-1 was repeated except that the components of the ink employed in Example Ib-1 were replaced by the following components:

| | wt. % |
|---|---|
| C. I. Acid Blue 9 | 3.0 |
| C. I. Acid Yellow 23 | 0.5 |
| Polyethylene glycol 200 | 15.0 |
| 2,3-di(1-pyrrolidine-2-one)-1-propanol | 3.5 |
| Deltop 33 (commercially available from Takeda Chemical Industries, Ltd.) | 0.2 |
| Ion-exchanged water | 77.8 |

The properties of the thus prepared ink were:

| pH = 10.3 | (20° C.) |
|---|---|
| Viscosity: 2.4 cP | (20° C.) |
| Surface tension: 52.4 dynes/cm | (20° C.) |

Example Ib-12

Example Ib-1 was repeated except that the components of the ink employed in Example Ib-1 were replaced by the following components:

| | wt. % |
|---|---|
| C.I. Acid Red 92 | 4.0 |
| Polyethylene glycol 200 | 16.0 |
| 2,3-di(1-piperidine)-1-propanol | 2.0 |
| Bioside 880 (commercially available from Taisho Co., Ltd.) | 0.2 |
| Ion-exchanged water | 77.8 |

The properties of the thus prepared ink were:

| pH = 10.5 | (20° C.) |
|---|---|
| Viscosity: 2.2 cP | (20° C.) |
| Surface tension: 54.0 dynes/cm | (20° C.) |

Comparative Example Ib-1

Example Ib-1 was repeated except that the components of the ink employed in Example Ib-1 were replaced by the following components:

| | wt. % |
|---|---|
| C.I. Direct Black 38 | 3.5 |
| Glycerin | 5.0 |
| Diethylene glycol | 15.0 |
| Dehydrosodium acetate | 0.2 |
| Ion-exchanged water | 76.3 |

The properties of the ink were:

| pH = 10.3 | (20° C.) |
|---|---|
| Viscosity: 2.5 cP | (20° C.) |
| Surface tension: 56.3 dynes/cm | (20° C.) |

Comparative Example Ib-2

Example Ib-1 was repeated except that the components of the ink employed in Example Ib-1 were replaced by the following components:

| | wt. % |
|---|---|
| C.I. Direct Black 154 | 3.5 |
| Polyethylene glycol 200 | 20.0 |
| Dehydrosodium acetate | 0.2 |
| Ion-exchanged water | 76.3 |

The properties of the thus prepared ink were:

| pH = 10.2 | (20° C.) |
|---|---|
| Viscosity: 2.4 cP | (20° C.) |
| Surface tension: 54.2 dynes/cm | (20° C.) |

Comparative Example Ib-3

Example Ib-1 was repeated except that the components of the ink employed in Example Ib-1 were replaced by the following components:

| | wt. % |
|---|---|
| C.I. Direct Black 19 | 3.0 |
| Glycerin | 15.0 |
| Dehydro tetrasodium acetate | 0.2 |
| Ion-exchanged water | 81.8 |

The properties of the thus prepared ink were:

| pH = 10.2 | (20° C.) |
|---|---|
| Viscosity: 2.3 cP | (20° C.) |
| Surface tension: 52.8 dynes/cm | (20° C.) |

Examples Ib-1 through Ib-12 were subjected to the same performance tests as were done in Example Ia-1, that is, (1) Image Clarity and Image Dryness Test, (2) Preservability Test, (3) Ink Droplet Ejection Stability Test, and (4) Ink Droplet Ejection Response Test. The results of those performance tests indicated that Examples Ib-1 through Ib-12 were as excellent as Example Ia-1.

Comparative Examples Ib-1 through Ib-3 were also subjected to the Ink Droplet Ejection Response Test. The result was that, in Comparative Examples Ib-1 through Ib-3, the nozzles became partially clogged when the apparatus and ink were allowed to stand at normal room temperature and humidity for one week, and also when the apparatus and ink were allowed to stand at 40° C./30% RH for one day, so that the direction of ejected ink droplets became extremely unstable and normal ink-jet printing was impossible.

A third embodiment of an aqueous ink for ink-jet printing according to the present invention was prepared, in which the compounds of the formula (Ia) employed in the previously described first embodiment were replaced by compounds of the following formula (II) and the other components were substantially the same as those employed in the first embodiment.

$$X^2-(CH_2)n-OH \qquad (II)$$

wherein $X^2$ represents

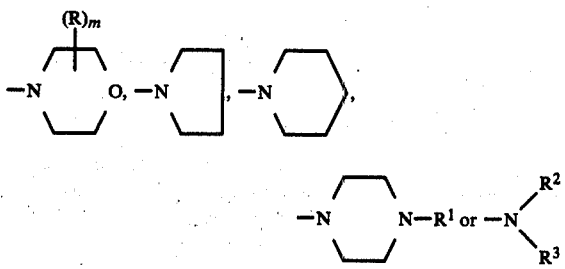

in which R, $R^1$, $R^2$ and $R^3$ independently represent an alkyl group with 1 to 4 carbon atoms or a hydroxyalkyl group with 1 to 4 carbon atoms m is an integer of 0 to 2; and n is an integer of 1 to 6.

Because the compounds of the formula (II) also are themselves so hygroscopic, they can be used as humectants instead of polyhydric aliphatic alcohols or alkyl ethers or polyhydric aliphatic alcohols.

Specific examples of the compounds of the formula (II) are as follows:
morpholine ethanol
N-methyl piperazino ethanol
(2,6-dimethyl morpholino) ethanol
(1-piperadine) ethanol
(1-pyrrolidine) ethanol
2-diethylamino ethanol
3-morpholino-1-propanol
3-(2,6-dimethyl) morpholino-1-propanol
3-(N-ethyl) piperazino-1-propanol
3-(1-piperadine)-1-propanol 4-morpholino-1-butanol
4-(N-hydroxyethyl) piperazino-1-butanol
4-(1-piperidine)-1-butanol
4-(1-pyrrolidine)-1-butanol
4-diethylamino-1-butanol
5-morpholino-1-pentanol
5-(N-methyl) piperazino-1-pentanol
5-(1-piperidine)-1-pentanol
5-(1-pyrrolidine)-1-pentanol
6-morpholino-1-hexanol
6-(2,6-dimethyl) morpholino-1-hexanol
6-(N-methyl) piperazino-1-hexanol
6-(1-piperidine)-1-hexanol
6-(1-pyrrolidine)-1-hexanol
6-diethylamino-1-hexanol

Example II-1

A mixture of the following components was heated to 50° C., stirred until completely dissolved, then filtered through a Telfon filter with 0.22 μm mesh to yield an embodiment of an aqueous ink for ink-jet printing according to the present invention:

|  | wt. % |
|---|---|
| C.I. Direct Black 38 | 3.5 |
| Diethylene glycol | 15.0 |
| Morpholine ethanol | 5.0 |
| Dehydrosodium acetate | 0.1 |
| Ion-exchanged water | 76.4 |

The properties of the thus prepared ink were as follows:

| pH = 10.2 | (25° C.) |
|---|---|
| Viscosity: 2.0 cP | (25° C.) |
| Surface tension: 53.5 dynes/cm | (25° C.) |

Example II-2

Example II-1 was repeated except that the components of the ink employed in Example II-1 were replaced by the following components:

|  | wt. % |
|---|---|
| C.I. Acid Black 2 | 1.0 |
| C.I. Direct Black 38 | 2.5 |
| Glycerin | 10.0 |
| 3-(2,6-dimethyl) morpholino-1-propanol | 7.0 |
| Dehydrosodium acetate | 0.1 |
| Ion-exchanged water | 76.4 |

The properties of the thus prepared ink were as follows:

| pH = 10.5 | (20° C.) |
|---|---|
| Viscosity: 2.3 cP | (20° C.) |
| Surface tension: 54.3 dynes/cm | (20° C.) |

Example II-3

Example II-1 was repeated except that the components of the ink employed in Example II-1 were replaced by the following components:

|  | wt. % |
|---|---|
| C.I. Acid Black 19 | 3.5 |
| Glycerin | 5.0 |
| Diethylene glycol | 10.0 |
| 6-(N—methyl) piperazino-1-hexanol | 2.5 |
| 2,2-dimethyl-6-acetoxy-dioxane-1,3 | 0.1 |
| Ethylene diamine tetrasodium acetate | 0.1 |
| Ion-exchanged water | 78.8 |

The properties of the thus prepared ink were as follows:

| pH = | 10.4 | (20° C.) |
|---|---|---|
| Viscosity: | 2.4 cP | (20° C.) |
| Surface tension: | 53.6 dynes/cm | (20° C.) |

Example II-4

Example II-1 was repeated except that the components of the ink employed in Example II-1 were replaced by the following components:

|  | wt. % |
|---|---|
| C.I. Acid Blue 9 | 3.0 |
| C.I. Acid Yellow 23 | 0.5 |
| Polyethylene glycol 200 | 15.0 |
| 4-(1-piperidine)-1-butanol | 3.0 |
| Deltop 33 (commercially available from Takeda Chemical Industries, Ltd.) | 0.2 |
| Ion-exchanged water | 78.3 |

The properties of the thus prepared ink were as follows:

| pH = 10.3 | (20° C.) |
|---|---|
| Viscosity: 2.3 cP | (20° C.) |
| Surface tension: 52.5 dynes/cm | (20° C.) |

Example II-5

Example II-1 was repeated except that the components of the ink employed in Example II-1 were replaced by the following components:

|  | wt. % |
|---|---|
| C.I. Acid Black 92 | 4.0 |
| Polyethylene glycol 200 | 14.0 |
| 3-morpholino-1-propanol | 4.0 |
| Dehydrosodium acetate | 0.2 |
| Ion-exchanged water | 77.8 |

The properties of the thus prepared ink were as follows:

| pH = 10.3 | (20° C.) |
|---|---|
| Viscosity: 2.3 cP | (20° C.) |
| Surface tension: 53.5 cynes/cm | (20° C.) |

Example II-6

Example II-1 was repeated except that the components of the ink employed in Example II-1 were replaced by the following components:

| | wt. % |
|---|---|
| C.I. Acid Black 154 | 3.5 |
| Polyethylene glycol 200 | 10.0 |
| 6-morpholino-1-hexanol | 5.0 |
| Bioside 880 (commercially available from Taisho Co., Ltd.) | 0.2 |
| Ion-exchanged water | 81.3 |

The properties of the thus prepared ink were as follows:

| pH = 10.2 | (20° C.) |
|---|---|
| Viscosity: 2.1 cP | (20° C.) |
| Surface tension: 50.0 dynes/cm | (20° C.) |

Comparative Example II-1

Example II-1 was repeated except that the components of the ink employed in Example II-1 were replaced by the following components:

| | wt. % |
|---|---|
| C.I. Direct Black 38 | 3.5 |
| Diethylene glycol | 20.0 |
| Dehydrosodium acetate | 0.1 |
| Ion-exchanged water | 76.4 |

The properties of the thus prepared ink were as follows:

| pH = 10.2 | (20° C.) |
|---|---|
| Viscosity: 2.2 cP | (20° C.) |
| Surface tension: 54.0 dynes/cm | (20° C.) |

Comparative Example II-2

Example II-1 was repeated except that the components of the ink employed in Example II-1 were replaced by the following components:

| | wt. % |
|---|---|
| C.I. Acid Black 2 | 1.0 |
| C.I. Direct Black 38 | 2.5 |
| Glycerin | 17.0 |
| Dehydrosodium acetate | 0.1 |
| Ion-exchanged water | 79.4 |

The properties of the thus prepared ink were as follows:

| | pH = 10.5 | (20° C.) |
|---|---|---|
| Viscosity: | 2.5 cP | (20° C.) |
| Surface tension: | 55.7 dynes/cm | (20° C.) |

Comparative Example II-3

Example II-1 was repeated except that the components of the ink employed in Example II-1 were replaced by the following components:

| | wt. % |
|---|---|
| C.I. Direct Black 19 | 3.5 |
| Glycerin | 5.0 |

| | wt. % |
|---|---|
| Diethylene glycol | 12.5 |
| 2,2-dimethyl-6-acetoxy-dioxane-1,3 | 0.1 |
| Ethylene diamine tetrasodium acetate | 0.1 |
| Ion-exchanged water | 78.8 |

The properties of the thus prepared ink were:

| pH = 10.4 | (20° C.) |
|---|---|
| Viscosity: 2.5 cP | (20° C.) |
| Surface tension: 52.5 dynes/cm | (20° C.) |

Examples II-1 through II-6 were subjected to the same performance tests as were done in Example Ia-1, that is, (1) Image Clarity and Image Dryness Test, (2) Preservability Test, (3) Ink Droplet Ejection Stability Test, and (4) Ink Droplet Ejection Response Test. The results of those performance tests indicated that Examples II-1 through II-6 were as excellent as Example Ia-1.

Comparative Examples II-1 through II-3 were also subjected to the Ink Droplet Ejection Response Test. The result was that, in Comparative Examples II-1 through II-3, the nozzles became partially clogged when the apparatus and ink were allowed to stand at normal room temperature and humidity for one week, and also when the apparatus and ink were allowed to stand at 40° C./30% RH for one day, so that the direction of ejected ink droplets became extremely unstable and normal ink-jet printing was impossible.

What is claimed is:

1. An aqueous ink for ink-jet printing comprising:
   a water-soluble dye;
   water; and
   a compound selected from the group consisting of (a) the compounds of formula (I)

wherein $X^1$ represents

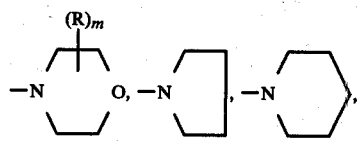

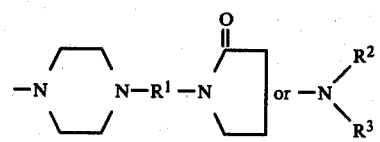

in which R, $R^1$, $R^2$ and $R^3$ independently represent an alkyl group with 1 to 4 carbon atoms or a hydroxyalkyl group with 1 to 4 carbon atoms, and m is an integer of 0 to 2; and at least one of the two Y's is a hydroxyl group, and when one Y, but not both Y's, is a hydroxyl group, the Y that is not a hydroxyl group is the same as $X^1$ and (b) compounds of the formula (II):

wherein $X^2$ represents

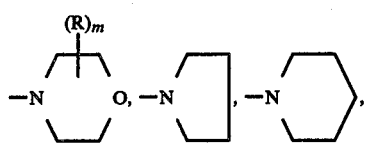

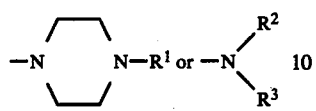

in which R, $R^1$, $R^2$ and $R^3$ independently represent an alkyl group with 1 to 4 carbon atoms or a hydroxyalkyl group with 1 to 4 carbon atoms, m is an integer of 0 to 2, and n is an integer of 1 to 6.

2. An aqueous ink for ink-jet printing as claimed in claim 1, wherein said water-soluble dye is selected from the group consisting water-soluble Color Index Direct Acid Dyes and water-soluble Color Index Acid Dyes.

3. An aqueous ink for ink-jet printing as claimed in claim 1, wherein the amount of said water-soluble dye in said aqueous ink is in the range of 1.0 wt.% to 10 wt.%.

4. An aqueous ink for ink-jet printing as claimed in claim 1, wherein the amount of said compound in said aqueous ink is in the range of 0.5 wt.% to 50 wt.%.

5. An aqueous ink for ink-jet printing as claimed in claim 1, further comprising a humectant.

6. An aqueous ink for ink-jet printing as claimed in claim 1, further comprising an antiseptic and anti-mold agent.

7. An aqueous ink for ink-jet printing as claimed in claim 1, further comprising a chelating agent capable of increasing the water-solubility of divalent metallic compounds in water.

8. An aqueous ink for ink-jet printing as claimed in claim 5, wherein said humectant is selected from the group consisting of polyhydric aliphatic alcohols and alkyl ethers of polyhydric aliphatic alcohols.

9. An aqueous ink for ink-jet printing as claimed in claim 6, wherein said antiseptic and anti-mold agent is selected from the group consisting of 2,2-dimethylacetoxydioxane-1,3, dehydrosodium acetate, p-ethoxybenzoic acid, p-hydroxy benzoic acid butyl ester, potassium sorbate, 2-pyridine thiol-1-oxidesodium salt, anionic surface active agents, Deltop 33 and Bioside 880.

10. An aqueous ink for ink-jet printing as claimed in claim 7, wherein said chelating agent is selected from the group consisting of disodium ethylenediaminetetraacetate, trisodium nitrilotriacetate, hydroxyethylethylenediamine trisodium acetate, diethylene triamino pentasodium acetate and uramil disodium acetate.

11. An aqueous ink adapted for ink-jet printing consisting essentially of:

1.0 to 10.0 wt.% of at least one water-soluble dye selected from direct dyes and acid dyes;

0.5 to 50 wt.% of a compound selected from the group consisting of compounds of the formula:

$$X^1\text{---}CH_2\underset{Y}{\underset{|}{C}HCH_2}\text{---}Y \qquad (I)$$

wherein $X^1$ represents

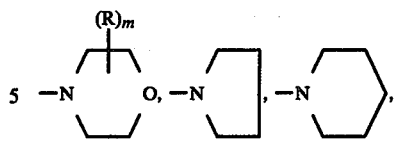

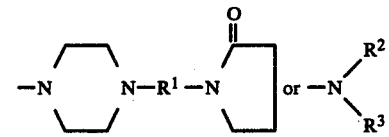

in which R, $R^1$, $R^2$ and $R^3$ each represent an alkyl group of 1 to 4 carbon atoms or a hydroxyalkyl group of 1 to 4 carbon atoms, m is an integer of from 0 to 2, and each Y is hydroxyl or is the same as $X^1$, with the proviso that at least one Y is hydroxyl; and $$X^2\text{---}(CH_2)_n\text{---}OH \qquad (II)$$

wherein $X^2$ represents

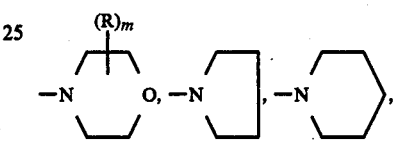

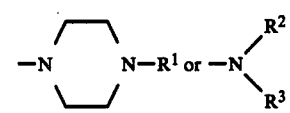

wherein R, $R^1$, $R^2$, $R^3$ and m have the same meanings as defined above, and n is an integer of from 1 to 6;

an effective amount of at least one member selected from the group consisting of a humectant selected from polyhydric aliphatic alcohols and alkyl ethers thereof, an antiseptic and anti-mold agent, a chelating agent effective to increase the water solubility of divalent metallic compounds, and mixtures thereof; and the balance is essentially water.

12. An aqueous ink as claimed in claim 11, wherein said compound has the formula:

$$X^1\text{---}CH_2\underset{OH}{\underset{|}{C}HCH_2}\text{---}OH. \qquad (Ia)$$

13. An aqueous ink as claimed in claim 11, wherein one Y is hydroxyl, and the other Y is the same as $X^1$.

14. An aqueous ink as claimed in claim 11, wherein said compound has said formula (II).

15. An aqueous ink as claimed in claim 11, wherein said aqueous ink contains 3 to 4 wt.% of said dye, 2 to 10 wt.% of said compound, 5 to 17 wt.% of said humectant, not more than 0.2 wt.% of said antiseptic and anti-mold agent, and not more than 0.1 wt.% of said chelating agent.

16. An aqueous ink as claimed in claim 11, wherein said aqueous ink contains 3 to 4 wt.% of said dye, 15 to 18 wt.% of said compound, not more than 0.2 wt.% of said antiseptic and anti-mold agent, not more than 0.1 wt.% of said chelating agent, and said aqueous ink is free of said humectant.

* * * * *

UNITED STATES PATENT AND TRADEMARK OFFICE
CERTIFICATE OF CORRECTION

PATENT NO. : 4 455 168

DATED : June 19, 1984

INVENTOR(S) : Masaru SHIMADA et al

It is certified that error appears in the above-identified patent and that said Letters Patent is hereby corrected as shown below:

Column 19, line 21; delete "Acid" (first occurrence only).

Signed and Sealed this

Nineteenth Day of February 1985

[SEAL]

Attest:

DONALD J. QUIGG

Attesting Officer     Acting Commissioner of Patents and Trademarks